United States Patent [19]

Ellis et al.

[11] 4,189,512
[45] Feb. 19, 1980

[54] STAPLE FIBRE WEBS

[75] Inventors: Peter M. Ellis; Alan Selwood, both of Harrogate, England

[73] Assignee: Imperial Chemical Industries Limited, London, England

[21] Appl. No.: 921,518

[22] Filed: Jul. 3, 1978

Related U.S. Application Data

[63] Continuation-in-part of Ser. No. 785,941, Apr. 8, 1977, abandoned.

[30] Foreign Application Priority Data

Apr. 8, 1976 [GB] United Kingdom ............... 14360/76
Apr. 6, 1977 [GB] United Kingdom ............... 14552/77

[51] Int. Cl.² ............................................. B32B 7/14
[52] U.S. Cl. ................................. 428/198; 428/224; 428/288; 428/373; 428/910
[58] Field of Search ............... 428/198, 373, 224, 288, 428/910

[56] References Cited

U.S. PATENT DOCUMENTS 2,705,687  4/1955  Petterson ............................. 428/198

Primary Examiner—Marion E. McCamish
Attorney, Agent, or Firm—Cushman, Darby & Cushman

[57] ABSTRACT

Very highly parallelized staple fibre webs are described and defined in terms of three parameters related to longitudinal and lateral cohesive properties. A process for the preparation of these webs is also described.

8 Claims, 4 Drawing Figures

STAPLE FIBRE WEBS

This is a continuation-in-part of application Ser. No. 785,941 filed Apr. 8, 1977 now abandoned.

The invention relates to highly ordered staple fibre webs having a high degree of longitudinal fibre orientation combined with sufficient lateral coherence to impart handleability.

Fibre webs, which are thin sheet like arrays of fibres, are the basic materials used for the production of non-woven fabrics. Arrays of both continuous filaments and staple fibres have been suggested as fibre webs and in particular carded fibre webs comprising a single web or a multiplicity of webs laid one on the other have commonly been used. Such carded fibre webs have only a limited degree of fibre orientation or parallelism and this introduces undesired limitations to the properties possible in a derived non-woven fabric. In U.S. Pat. Nos. 3,098,265 and 3,119,152 methods of enhancing the degree of fibre orientation in a carded fibre web have been described wherein the carding machine is modified with additional roll or belt apparatus so as to doff the web while applying a small degree of drafting. While such webs have at least some enhanced fibre orientation they do not have this feature in combination with other desired properties such as a low but positive transverse coherence.

Accordingly the present invention provides a highly ordered staple fibre web comprising a major proportion of synthetic thermoplastic fibres and having a fibre direction coherence of at least 1.0 g/cm per g/m$^2$, a cross fibre direction coherence of less than 0.2 g/cm per g/m$^2$, preferably less than 0.1 g/cm per g/m$^2$ and a tweezer separation distance of at least 5 cm.

In highly ordered webs of this invention the degree of orientation is about 100%, that is to say all the fibres are substantially completely parallelised with their longitudinal directions coinciding with the machine or long direction of the web. Crimp is present in the webs to provide the required low degree of transverse coherence but this is superimposed upon the parallelism of the fibres and does not substantially affect this condition. In a preferred method for the production of the webs of this invention hereinafter described, a heat treatment is applied and this treatment may enhance the web coherence somewhat by causing some bonding of thermoplastic fibres at points of contact.

The fibre coherence and tweezer distance properties together measure the fibre parallelism and handleability of a web and the three values are in some measure independent and in some measure interrelated. A web having a combination of the three values as hereinbefore specified is one having a very high order of fibre parallelism combined with sufficient coherence longitudinally and transversely to withstand the tensions occurring during subsequent processing as for example the laying up of several webs together and the bonding of a web or webs to form a useful non-woven fabric suitable for apparel or other textile purposes. Thus an oriented web of the desired degree of fibre parallelism should exhibit a low but measurable cross-fibre coherence, preferably more than 0.02 g/cm per g/m$^2$, in order that the web has sufficient strength and integrity to be passed through subsequent processes without damage. Webs according to the invention, which include a major proportion of synthetic thermoplastic fibres, may have the desired low cross fibre coherence associated with quite high values of fibre direction coherence but as the latter value increases such webs tend to become somewhat stiffer. It is therefore preferred that for these webs the fibre direction coherence does not exceed 50 g/cm per g/m$^2$ or further preferably does not exceed 40 g/cm per g/m$^2$. These upper values of fibre direction coherence may be exceeded in some cases since some of the stiffness of a web which passes through to a non-woven fabric made therefrom may be removed or reduced by mechanical or hot liquid treatments such as fulling, washing or dyeing. However if the stiffness is undesired in the greige state non-woven fabric then the foregoing upper limits of fibre direction coherence in the web should be adhered to.

As described in detail hereinafter the fibre direction coherence is measured using a test length of web greater than the mean fibre length and thus this property is influenced by the presence of fibre entanglements or other bonds between fibres resisting slippage of one fibre over the other. Undue stiffening due to entanglement or other bonding in the web and a derived non-woven fabric is preferably avoided as this may interfere with the properties of the derived fabric or require additional fabric treatment.

The tweezer separation distance, the measurement of which is described hereinafter, is another measure of coherence particularly cross-fibre coherence and for webs of maximal parallelism and minimal but adequate cross fibre direction coherence, values of tweezer separation distance may be quite high. However the values of tweezer separation distance and fibre and cross-fibre coherence are sufficiently inter-related as to set an upper limit for tweezer separation distance. As this value increases one or both of the coherency values tend to decrease and eventually would reach an unacceptable level.

Web coherence is conveniently measured using a flexible tensile test machine such as the Instron machine. For both fibre and cross-fibre direction measurements a sample width of 2.5 cm equal to the width of the machine clamping jaws which are operated at a crosshead speed of 20 cm/min together with a chart speed of 10 cm/min. For fibre direction coherence samples having a length 1.5 times the nominal or mean fibre length plus the clamping length are cut and weighed carefully so as not to disturb the delicate fibre structure and then mounted in the test machine. For cross-fibre direction coherence measurements a test sample length of 1 cm (plus clamping length) is used and for both measurements the coherence is calculated from the measured breaking load as follows;

$$\text{Coherence} = \frac{B}{2.5} \times \frac{L}{100} \times \frac{W}{100} \times \frac{1}{M} \text{ gm/cm per g/m}^2$$

where

B is the measured breaking load in g
L is the sample length in cm
W is the sample width in cm and
M is the sample weight in g For measurement of tweezer separation distance stainless steel tweezers are selected measuring 13 cm end to end and 11 cm from the hinge point to the tweezer tips, the hinge resilience being such that there is 1 cm separation of the tips from beginning to end of a test. One limb of the tweezers is attached rigidly to the measuring arm of a rotary tensiometer for example of the "Zivy" type having a full scale deflection of 30 g. To effect a measurement the tweezers tips (sharpened to fine points if necessary) are inserted in the closed position into the web sample to the specified depth, the sample having been suitably supported in a horizontal plane under slight tension. The tips are then allowed to open to 1 cm separation in the cross fibre direction and the gauge moved horizontally and parallel to the fibre direction along the web until the initial zero reading rises to 20 g. The distance moved in cm between these points is the tweezer separation distance which is approximately independent of web weight at least for values in the range 40±10 g/m². For webs of the invention weighing 10–100 g/m² the product of tweezer separation distance and web weight should be at least 200 cm g/m².

A useful visual assessment of web orientation may be carried out using a pin-hole camera method. A strong source of illumination as for example a mercury vapour lamp and appropriate filter are used to illuminate a pin hole in an opaque screen which is parallel to and spaced 45 cm from the web sample which is positioned close enough to a camera preferably a camera of the Polaroid Lane type giving direct prints, so that a sharp image of the pin hole as diffracted by the web is projected onto the film.

Webs according to this invention are characterised by a diffraction pattern showing two opposed lobes. The attached figures illustrate diffraction patterns of prior art webs and webs according to this invention wherein.

Figure 1:
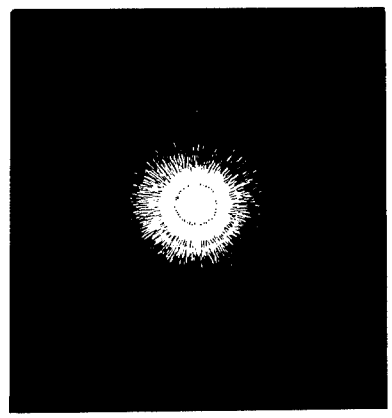
FIG. 1 is the diffraction pattern of a normal card web of polyester fibres.

Referring to FIG. 1 it is seen that a substantially uniform diffraction pattern is produced exhibiting no lobes.

Figure 2:
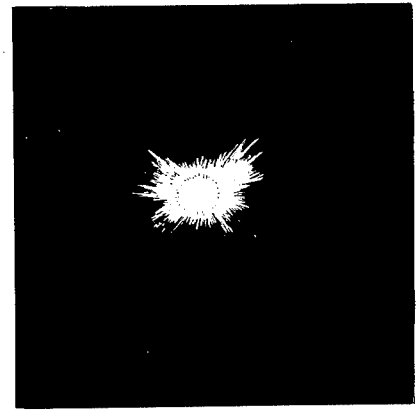
FIG. 2 is the diffraction pattern of a continuous polyester filament web produced as described in UK patent specification No. 1 001 813.

In FIG. 2 the diffraction pattern exhibits four substantially uniformly spaced lobes in conformity with a high degree of parallelism between the continuous filaments.

Figure 3:
FIG. 3 is the diffraction pattern of a web according to the invention made from bicomponent polyester fibres having an eccentric sheath/core configuration and FIG. 4 is the diffraction pattern of a web also according to the invention of bicomponent polyester fibres in a side by side configuration.
Figure 4:
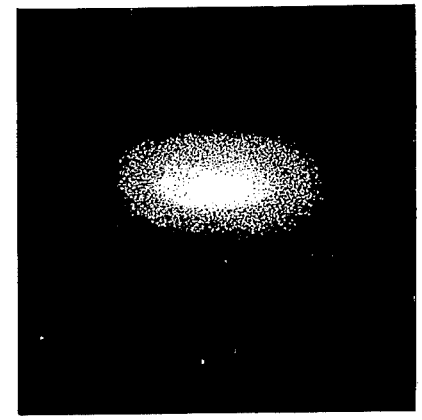

In FIG. 3 and FIG. 4 bilobate patterns results from the high fibre parallelism and small cross-fibre orientation characteristic of webs according to this invention proposed as hereinafter described in Example 3 and 2 respectively. The pattern in FIG. 3 is sharper and narrower than that of FIG. 4, and this is believed to be due to the presence of a finer and tighter helical crimp in the FIG. 4 web prepared from side-by-side bicomponent fibres which may also influence the relative coherency values of these two webs.

Highly ordered webs according to this invention may be produced by any method wherein the requisite high degree of fibre parallelism together with the low cross-fibre orientation or coherence is induced in a staple fibre web. A preferred method for the production of highly ordered webs having the desired properties from staple fibre slivers consisting of or including some thermoplastic crimpable fibres is a process wherein a plurality of staple fibre slivers are spread and merged into a thin web by passage between a series of fluted drafting roller pairs being overfed to the last stage and there subjected to a heat treatment which induces crimping and the formation of a coherent highly ordered web substantially without disturbing the high fibre orientation.

In order to predict and control such a process for producing a highly ordered coherent web according to this invention the following relationship may be used;

$$W = \frac{100}{s} m \frac{1}{D} (1 + \frac{f}{100})$$

where
W is the weight, in g/m² of the final coherent ordered web,
s is the spacing, in centimeters, between slivers as fed to the first pair of rolls.
m is the weight of a sliver in g/m.
D is the total draft up to but not including the heat treatment stage and
f is the percentage overfeed in the heat treatment stage.

Operation of a process according to this relationship readily allows selection of the various process variables. Since the value of overall draft is inserted in the foregoing relationship there is possibly a further selection within the overall value, D, of the number of stages and the degree of draft, if any, at each stage. In a preferred form of the process three stages are employed and in the intermediate stage substantially no drafting is employed.

Webs according to the invention are basic materials for the preparation of non-woven fabrics and one or more webs may be stacked together for this purpose and thereafter bonded by known means, as for example by discrete fused bonds arranged in a pattern across the web(s) to provide the physical properties of strength, drape etc require in the final fabric. Webs of the invention being composed of substantially completely parallelised fibers are particularly adapted to this purpose since the bond pattern may be placed in relation to the direction of fibre orientation and so enhance the bonded fabric properties. In a preferred bonding method a pattern of segmental fused bonds is applied to one or more webs of this invention so that the maximum distance between bonded areas measured in the direction of fibre orientation is not more than 10 mm and the bonded areas are so arranged that a projection of said bonded areas within this maximum distance onto a line perpendicular to the predominating direction of fibre orientation at the surfaces is continuous. Preferably in the projection of bonded areas onto a line perpendicular to the predominating direction of fibre orientation there is a small amount of overlap at the ends of the projections of neighbouring bonds onto that line to minimise the possibility of a fibre meandering around the ends of bonded areas without being bonded to adjacent fibres and hence being susceptible to breakage when the surface is abraded.

In the last stage of the above described method for the production of a highly ordered web of this invention a heat treatment induces crimp and web coherence by fibre entanglement through the crimps. It is preferred that these crimps are small in relation to the size and spacing of the bonds in the bond pattern subsequently applied. It is desirable also that the frequency of crimp is high, there being desirably more than 10 crimps in the fibres in the maximum distance between bonded areas measured in the direction of predominating fibre orientation.

Bonding may be effected by passing the fibrous assembly through the nip of a hot calender press, at least one roll of which bears a pattern of discrete bonds which corresponds to the desired pattern of bonded areas. An alternative method of bonding employs an ultrasonically energised horn acting in conjunction with a patterned anvil.

The fibres of a web may include a minor proportion of natural or artificial fibres. The synthetic fibres may be polyesters, polyamides or copolymers of these classes of organic linear polymers and it is preferred that at least some of the fibres in a web should be synthetic thermoplastic bicomponent fibres in which at least part of one component present at the surface of the fibres is of lower softening or melting point and different shrinkage propensity than the other component to impart the desired crimpability to the fibres. Such bicomponent fibres are commonly of the side-by-side or sheath and core configuration.

The invention is illustrated by the following Examples.

EXAMPLE 1

A quantity of polyester bicomponent fibres (3.3 decitex 60 mm length with components arranged side-by-side, one component being polyethylene terephthalate and the other being a copolymer of 15 mole percent ethylene isophthalate and 85 mole percent ethylene terephthalate) was assembled into a sliver weighing 3.5 g/meter. Eight of such slivers were introduced side-by-side into a two stage drafting frame. The ratio of speeds between first and second roller pairs was 1 to 1.8, and between second and third roller pairs was 1 to 6. The fibres of the slivers under these conditions opened and merged to form a sheet in which the fibres were substantially parallel to each other. The sheet was heated by hot air at about 150° C. between the third roller pair and a fourth roller pair, the speed of the fourth pair being one half of that of the third pair. The heat treatment caused the fibres to develop a low amplitude, high frequency helical crimp, which imparted a degree of coherency to the fibrous sheet enabling it to be handled in subsequent steps. The weight of the sheet which exhibited a bilobate diffraction pattern was about 29 g m$^{-2}$, the fibre and cross fibre direction coherences being 6 and 0.06 g/cm per g/m$^2$ respectively and the tweezer separation distance 15 cm.

EXAMPLE 2

A quantity of polyester bicomponent fibres 3 denier 49 mm length, with the components arranged in eccentric core-sheath relationship the core component being polyethylene terephthalate and the sheath being a copolymer of 15 mole percent ethylene isophthalate and 85 mole percent ethylene terephthalate was assembled into a sliver weighing 2.0 g/m. Seventeen such slivers were introduced side-by-side into a three stage drafting frame. The ratio of speeds between first and second roller pairs was 1 to 2.0, and between second and third rollers pairs was 1 to 0.95 and between third and fourth roller pairs was 1:3.5. The fibres of the slivers under these conditions opened and merged to form a sheet in which the fibres were substantially parallel to each other. The sheet was heated by hot air at about 170° C. between the fourth roller pair and a fifth roller pair, the speed of the fifth pair being 73% of that of the fourth pair. The heat treatment caused the fibres to develop a low amplitude, high frequency helical crimp which imparted a degree of coherency to the fibrous sheet enabling it to be handled in subsequent steps. The weight of the sheet which exhibited a bilobar pattern, was about 35 g m$^{-2}$, the fibre and cross fibre coherences being 12 and 0.04 g/cm per g/m$^2$ respectively and the tweezer separation distance 26 cm.

COMPARATIVE EXAMPLES A AND B

A normal web (Web A) prepared from the eccentric sheath/core bicomponent fibres as used in Example 2 and a web (Web B) prepared according to the method of UK patent specification No. 1 001 813 from polyethylene terephthalate continuous filament tow were submitted to the foregoing coherency tests with the following results.

|  | WEB A | WEB B |  |
|---|---|---|---|
| Fibre direction coherence | 0.2 | —* | g/cm per g/m$^2$ |
| Cross fibre direction coherence | 2.1 | 0.25 | g/cm per g/m$^2$ |
| Tweezer separation distance | 3 | 3.5 | cm |

*Not measured because web of continuous filaments.

Both these webs exhibit an undesirably high cross fibre coherence and low-separation distance. In addition Web A exhibits a very low fibre direction coherence.

We claim:

1. A highly ordered staple fibre web comprising a major proportion of synthetic thermoplastic fibres and having a fibre direction coherence of at least 1.0 g/cm per g/m$^2$, a cross fibre direction coherence of less than 0.2 g/cm per g/m$^2$ and a tweezer separation distance of at least 5 cm.

2. A web according to claim 1 wherein the cross fibre direction coherence is less than 0.1 g/cm per g/m$^2$.

3. A web according to claim 1 wherein the cross fibre direction coherence is more than 0.02 g/cm per g/m$^2$.

4. A web according to claim 1 wherein the product of tweezer separation distance in centimeters and the web weight in g/m$^2$ is at least 200.

5. A web according to claim 1 wherein the pin-hole diffraction pattern measured as hereinbefore described is bilobate.

6. A web according to claim 1 wherein at least some of the synthetic fibres are side-by-side or sheath/core bicomponent fibres.

7. A web according to claim 6 wherein the fibre direction coherence does not exceed 50 g/cm per g/m$^2$.

8. A web according to claim 6 wherein the fibre direction coherence does not exceed 40 g/cm per g/m$^2$.

* * * * *